United States Patent [19]

Dooley et al.

[11] 4,423,624

[45] Jan. 3, 1984

[54] DIESEL TIMING LIGHT

[75] Inventors: Daniel Dooley, Burr Ridge; Joseph Dooley, Chicago, both of Ill.

[73] Assignee: Creative Tool Company, Burr Ridge, Ill.

[21] Appl. No.: 351,662

[22] Filed: Feb. 24, 1982

[51] Int. Cl.[3] .......... G01M 15/00

[52] U.S. Cl. .......... 73/119 A; 73/115

[58] Field of Search .......... 73/119 A, 115, 35; 324/392

[56] References Cited

U.S. PATENT DOCUMENTS 4,163,385 8/1979 Kato et al. .......... 73/35

4,266,427 5/1981 Wesley .......... 73/119 A

*Primary Examiner*—Jerry W. Myracle

*Attorney, Agent, or Firm*—Neuman, Williams, Anderson & Olson

[57] ABSTRACT

A stroboscopic timing system for diesel engines of the type having apertures in each cylinder for normally accepting glow plugs. A signal that varies in accordance with pressure changes within the cylinder is generated by a piezoelectric transducer mateable with a glow plug aperture, and the transducer signal is processed by filtering and other discriminating circuitry to provide a timing pulse that occurs upon the initiation of combustion within the cylinder. A conditioning circuit shapes this pulse into suitable form for triggering a high intensity stroboscopic light for illuminating timing marks on the engine drivetrain.

4 Claims, 4 Drawing Figures

DIESEL TIMING LIGHT

FIELD OF THE INVENTION

This invention relates generally to diagnostic equipment for internal combustion engines but more particularly to devices for monitoring the timing of combustion within a diesel engine.

BACKGROUND OF THE INVENTION

Numerous devices have been developed over the years for timing the spark on internal combustion engines of the carbureted type, including high intensity strobe lights, called timing lights, which have operated in conjunction with timing marks on the dynamic damper of the engine. However, the timing of diesel engines has proven to be a much more difficult task in that electrical ignition is not employed and hence there is no spark plug from which to obtain the ignition signal. In a diesel engine, combustion is achieved through heat and pressure developed within the cylinder and, as such, the point of combustion is quite difficult to determine with conventional detection techniques. In the Dooley et al. U.S. Pat. No. 4,227,402 a system is disclosed which incorporates a specially adapted transducer which mates with the glow plug receptacle of a diesel engine to provide a signal indicative of pressure changes within the cylinder. Circuits are provided for detecting the point in time at which the nozzle begins to open to inject fuel into the cylinder. Additionally, the aforesaid Dooley et al patent discloses the alternative of detecting the point and time at which peak pressure is obtained within the cylinder. Either of these timing indications is then compared with an electrical signal taken from the engine dynamic damper or flywheel indicating achievement of the TDC position of the number one cylinder. The complexity of this system has made it somewhat complex and expensive for the average mechanic to use in that it departs from the conventional strobe technology with which most mechanics have been familiar over the years. Furthermore, the timing of nozzle opening or peak pressure relative to TDC has achieved only limited acceptance to date as a diagnostic technique.

Accordingly, it is a primary object of the present invention to provide a timing system which retains the inherent simplicity of stroboscopic timing lights, while at the same time being applicable to the difficult task of timing diesel engines in which no spark is available.

It is a further object of the present invention to provide a stroboscopic timing system which is responsive to the actual combustion of fuel within the cylinder. Timing systems have been proposed which monitor the combustion events optically by using a photo detector or optical lens within the cylinder. However, the utility of systems of this type is somewhat limited by the fact the combustion within the cylinder creates carbon residue that makes optical detection of the flame quite difficult over time periods of any significant duration.

Accordingly, it is a further object of the present invention to provide a timing system which is operative over long periods of time without significant modification, cleaning or adjusting. It is a related object to provide a timing system which utilizes an economical and rugged transducer for detecting the combustion event.

It is still a further object of the present invention to provide a timing system which is consistent with conventional stroboscopic timing techniques and is readily understood by mechanics and consumers.

BRIEF SUMMARY OF THE INVENTION

These and other objects and advantages of the invention are achieved through the provision of a timing system utilizing a pressure transducer which is adaptable to glow plug apertures, a signal processing circuit for detecting the combustion event from the signal developed by the transducer and providing a conditioned timing pulse in response thereto, and a stroboscopic timing light of high intensity for providing a visual indication of the combustion event or for cooperating with the timing marks on a moving part of the drivetrain of the engine to provide a numerical indication of the relative timing between combustion and the achievement of TDC. The piezoelectric transducer used herein is specially adapted for glow plug receptacles and presents no operational parts within the cylinders to be damaged during combustion. The signal processing circuit is specially adapted for use with the piezoelectric transducer and has filtering characteristics to create narrow selectivity of frequency and amplitude for detecting only the forward edge of the combustion pressure rise.

Other objects and advantages of the invention will become more apparent upon reading of the following detailed description taken in connection with the drawings and the claims.

While the invention will be described in connection with certain embodiments, it is not intended that the invention be limited to those embodiments but rather the invention should be construed to include all alternatives, equivalents and modifications within the spirit and scope of the invention as defined by the appended claims.

DESCRIPTION OF THE PREFERRED EMBODIMENTS

Figure 1:
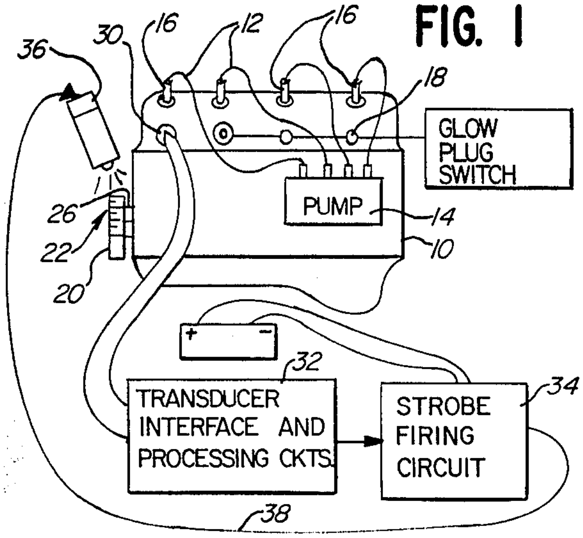
FIG. 1 is a general system block diagram of the present invention shown in conjunction with a conventional diesel engine.

Turning first to FIG. 1, there is shown a conventional diesel engine 10 having injection lines 12 emanating from a pump 14 and flowing to injector nozzles 16 coupled through each of a plurality of cylinders. Each cylinder additionally has a glow plug 18 extending through an aperture for creating heat within the cylinder to aid the combustion process during starting and warm-up in a manner to be described more fully below. The engine 10 additionally has a driveshaft driven dynamic damper 20 with timing marks 22 thereon and a reference marker or pointer 26 which is stationary and coupled to the block of the engine 10. The timing marks, pointer and dynamic damper operate in a manner that has become conventional and accepted for internal combustion engines utilizing sparkplugs. As it is generally known in the art, the timing marks 22 include a primary mark which is located on the periphery of the flywheel at a predetermined position which creates alignment between that mark and the fixed pointer 26 whenever a predetermined cylinder, typically the number one cylinder, is in its Top Dead Center (TDC) position. This mark on the damper is often marked with the indicia "0°" or "TDC", indicating Top Dead Center. In some engines the timing marks are found on fan pulleys or other components driven by the driveshaft.

In spark ignited engines, such as those fueled by gasoline or the like, the timing marks provide a reference which is viewed with a timing light operating in accordance with the stroboscopic effect. In other words, the light is repetitively actuated in response to a predetermined event, typically the occurrence of an electrical spark created by the ignition coil during each engine cycle. As noted above, however, diesel engines do not have sparkplugs, an ignition coil or other parts of the electrical ignition system conventionally found on internal combustion engines of the carbureted type.

While the graduated markings for timing are shown to be on the moving dynamic damper for convenience of description, in the preferred form of the invention the graduated markings, typically $-16°$ to $+16°$ are molded or machined into the stationary part of the engine, namely the engine block or a part affixed to that block. The only marking on the moving dynamic damper or flywheel in this arrangement is the single mark corresponding to the angular position of top dead center when aligned with the 0° mark on the graduated markings.

Accordingly, transducers have been developed which detect combustion events within the cylinder through means other than the electrical ignition system. An example of such a transducer is shown in Dooley et al. U.S. Pat. No. 4,227,402, which discloses a transducer that is adaptable to act as a replacement for the conventional glow plug in one of the apertures on the engine, preferably the aperture for the glow plug in the combustion chamber of the number one cylinder. In accordance with the present invention, therefore, it has been determined that a signal developed by a glow plug replacement transducer of the aforesaid type may be utilized together with additional signal processing components and a suitable electronic strobe light to provide for diesel engines a stroboscopic timing system having an economy of manufacture and simplicity of use heretofore available only in timing systems for spark ignited engines. To this end, the system diagram shown in FIG. 1 includes a glow plug replacement transducer 30 fitted into the aperture for the number one cylinder and adapted to produce a signal that varies in accordance with pressure changes within the cylinder. The system further includes a processing circuit 32 adapted to receive the output signal from the transducer and to produce in response thereto a timing pulse indicative of the occurrence of the primary pressure rise within the cylinder resulting from the initiation of combustion. Finally, the signal processing circuit 32 is coupled to strobe firing circuit 34 which actuates a high intensity strobe light 36 via a connection 38 and actuates the light at a predetermined time during each combustion cycle of the cylinder to provide a flash of light for illuminating the timing marks on the dynamic damper and thus to provide a visual indication of combustion timing.

Figure 2:
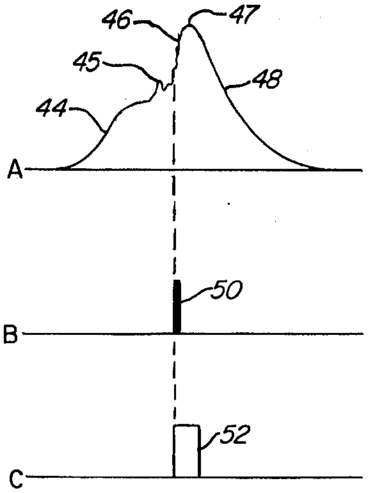
FIG. 2 is a timing diagram of the signals and events illustrating the operation of the invention shown in FIG. 1.

FIG. 2 illustrates the timing relationships between the various signals generated within the system. The top signal, designated A, represents the signal developed by the transducer indicative of pressure within the cylinder. The amplitude of this signal rises from the beginning of the power stroke of the cylinder, as indicated at 44. Shortly prior to combustion the signal becomes oscillatory as a result of spring chatter 45 occurring as the nozzle begins to open. The primary amplitude rise 46 results when combustion of the gases begins in the cylinder. A peak pressure level 47 is thereafter reached, after which the pressure within the cylinder falls as the piston moves downward and creates greater volume within the cylinder. The latter event is indicated at 48.

Signal B of FIG. 2 represents the signal developed by the transducer interface and processing circuit 32. That circuit, as described more fully below, receives the transducer output signal and provides a primary timing pulse 50 in response to the primary pressure rise which creates the steep positive slope 46 in FIG. A. At all other times the amplitude of the output of the processing circuit, indicated at B, remains low. Internal to the processing circuit 32 the primary timing pulse 50 is conditioned and converted into a fixed duration pulse 52, as shown at curve C in FIG. 2, suitable for actuating the strobe light 36.

Figure 3:
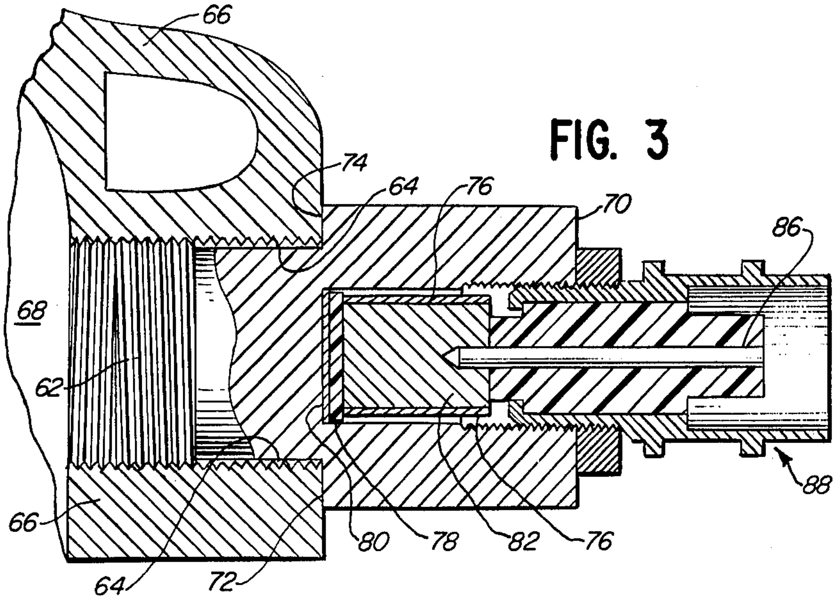
FIG. 3 is a cutaway view in partial cross-section of the transducer device used in conjunction with the present invention.

The transducer preferred for use in the present invention is shown in greater detail in FIG. 3. While this preferred form of transducer is described more fully in Dooley et al. U.S. Pat. No. 4,227,402, which is incorporated herein by reference, a brief explanation of its structure and operation is in order. The transducer 30 consists of a integrally formed outer body 60 having a threaded shank portion 62 adapted to extend through threaded aperture 64 in the compression head 66 defining the combustion chamber 68. External to the surface of the compression head 66 the body 60 expands into a head portion 70 which is typically hex-shaped for engagement by a suitable pliers, wrench or the like. The head portion 70 forms shoulders 72 and 74 which tighten against the surfaces of the head surrounding the glow plug aperture 64. Internal to the head portion 70 is a cavity 76 for housing a disc of piezoelectric material 78 which is coupled to the forward end 80 of the cavity by a suitable conductive adhesive. The other side of the piezoelectric element 76 is normally compressed by a resilient plug 82 having a conductive inner core and a heat shrinkable insulating rubber outer sleeve as described more fully in the aforesaid Dooley et al. patent. A signal from the piezoelectric element 78 passes through the conductive rubber plug 82 to the central conductor 86 of a BNC-type connector 88. The outer shell of the BNC connector 88 is threaded into the end of the head portion 70 of the transducer body 60 to form a continuous circuit path therewith to engine ground.

In operation, pressure changes within the cylinder impact upon the inner end of the threaded shank portion 62 of the transducer and create variations in the seating pressure with which the shoulder areas 72 and 74 of the head portion 70 against the cylinder head. These variations are detected by the piezoelectric element 78 and transmitted to the BNC connector 88 via the conductive rubber plug 82.

The transducer interface and processing circuit 32 receive the signal from the transducer 30 via a two terminal connection which includes a common ground line coupled to engine ground and the outer shell of the transducer BNC connector 88 plus a central signal carrying lead electrically coupled to the center shaft 86 of the BNC connector 88. The circuit in general includes an input section which is adapted to amplify the transducer output signal and providing an extremely high impedance input thereto. Additionally, the circuit includes a frequency filtering section 90 providing band pass characteristics suitable for detecting the primary pressure rise 46 (curve A of FIG. 2) resulting from combustion beginning within the cylinder. An amplitude filtering circuit, or threshold detector, 93 is provided to achive further selectively and discrimination for the primary firing pulse 50. Finally, the circuit conditions the pulse 50 derived by filtering to provide the constant width output pulse 52 suitable for activating the strobe. This conditioning consists primarily of a monostable multivibrator, as will be discussed below. Finally, the conditioned firing pulse drives the strobe firing circuit 34 (FIG. 1), which may be any of a variety of circuits conventional within the art and well-known for this purpose. Typically, the strobe firing circuit contains components for converting the 12 volt DC battery voltage into a much higher voltage, typically 400 volts, suitable for firing a high intensity strobe light of the xenon, argon or neon type. The strobe firing circuit may, in appropriate circumstances, be housed within the strobe light 36 rather tha being isolated therefrom at some distance. In the preferred form, the entire interface and processing circuits 32 and 34 are contained within a common housing with the strobe light 36.

Returning then to FIG. 4, a power supply 100 receives the 12 volt DC signal from the vehicle battery and provides a supply voltage +V, typically in the range of +5 or +12 volts and a reference voltage +V/2. The output of the transducer is coupled to the isolation amplifier circuit 90 which consists of an operational amplifier 101 having its inverting terminal coupled to the transducer 30 via a resistor 102. The noninverting input terminal of the operational amplifier 101 is referenced to the reference voltage +V/2. The amplifier 101 has an output line 104 which is coupled back to the inverting input via a parallel RC network consisting of a capacitor 106 and a resistor 108. In the preferred arrangement, the resistors 102 and 108 are chosen to be of equal value so as to provide a unity voltage gain, high current gain for the amplifier. Additionally, the resistor 102 is chosen to be of sufficiently high value, typically one megohm or more, to provide a very high input impedance to the amplifier and thereby a very low drain for the transducer 30.

Figure 4:
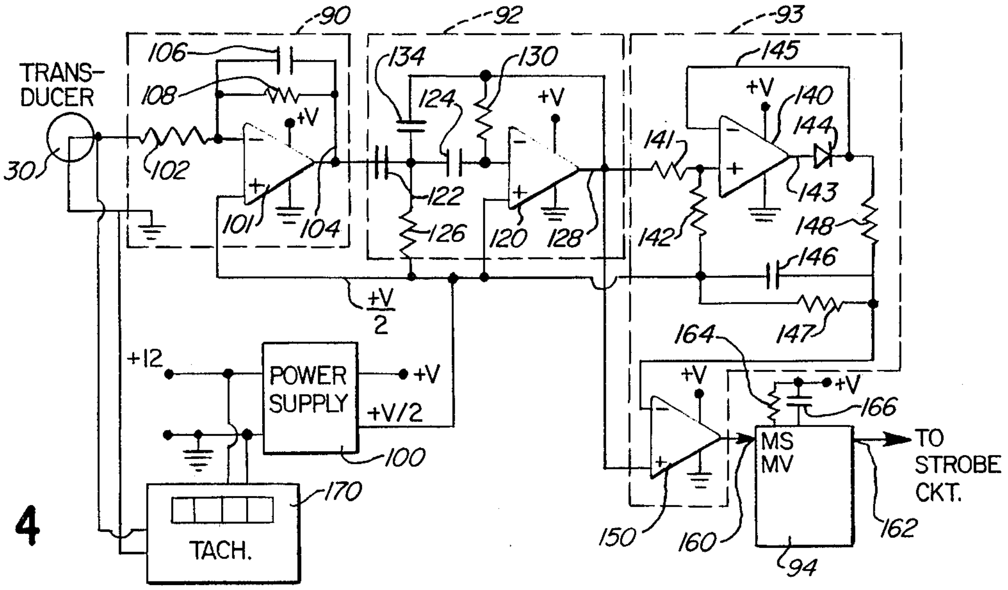
FIG. 4 is a detailed circuit schematic of the electrical circuit elements of the timing system shown in FIGS. 1 and 2.

For the purpose of detecting the primary pressure rise due to the combustion within the cylinder, the output 104 of the operational amplifier 101 is coupled to a high pass filter 92 consisting of an operational amplifier 120 and its associated RC networks. The amplifier 120 has its noninverting input terminal referenced to the voltage +V/2, while the inverting terminal thereof is fed through a network consisting of series capacitors 122, 124 and a shunt resistor 126 coupled from the junction of the capacitors 122 and 124 to the reference voltage +V/2. The output of the operational amplifier 120 appears on a line 128 and is fed back through a resistor 130 to the inverting terminal of the amplifier 120. The output on the line 128 is also coupled through a capacitor 134 to the junction of capacitors 122 and 124. While a single high pass filtering stage is shown in FIG. 4, it will be appreciated that additional stages may be included, as needed, to obtain the frequency selectivity desirable for particular applications. It has been found that a suitable corner frequency (fo) for the filter stage 92 is 1 Khz.

Additional filtering is provided by the threshold detection circuit 93. This circuit provides additional noise immunity by passing only the pulses emanating from the filter 92 having an amplitude which exceeds a certain percentage of the average peak amplitude. To this end, the threshold detection circuit includes a first section, including an operational amplifier 140, for developing a DC level proportional to the average peak amplitude of the output of the filter 92. This average DC level is then used as a reference in a second operational amplifier 150 for comparison to all of the pulses, whatever their magnitude, emanating from the output of the filter circuit 92. To this end, the operational amplifier 140 has its noninverting input terminal coupled to receive the output 128 of the amplifier 120 through a series resistor 141 while being referenced to +V/2 through a shunt resistor 142. The output of the amplifier 140 is provided on a line 143 which is coupled to the anode of a diode 144. The cathode of the diode 144 is coupled back to the inverting input of the amplifier 140 through a connection 145. For storing the peak pulses passing through the amplifier 140, there is provided a parallel RC network consisting of a capacitor 146 and resistor 147. A small dropping resistor 148 couples the cathode of the diode 144 to the junction of the RC network 146, 147. At this junction there appears the DC level proportional to the average peak value of the signals emanating from the amplifier 92, although there may be some ripple effect remaining on this DC signal. The proportionality factor is determined by selections of the resistors 142 and 141. In one form this factor has been chosen to be 80–85% of the peak value. This DC level is provided at the inverting input terminal of the operational amplifier 150, while the non-inverting input terminal thereof receives its signal directly from the output 128 of the filter 92. Pulses from the filter 92 which exceed the predetermined amplitude are passed to the output of the operational amplifier 150 and amplified greatly into pulse form. The output of the amplifier 150, which is also the output of the threshold detector 93, therefore corresponds to the pulse shown on curve B of FIG. 2.

In order to convert this narrow pulse into a pulse of sufficient width for firing a stroboscopic timing light, the circuit of FIG. 4 includes a monostable multivibrator 94 having its input terminal 160 coupled to receive the output from the operational amplifier 150 and its output terminal 162 connected to the strobe firing circuit 34. For controlling the duration of the pulse output from the multivibrator 94, an RC network consisting of resistor 164 and a capacitor 166 is referenced to the supply voltage +V. By properly choosing the resistor 162 and capacitor 166, a wide range of pulse widths can be chosen to accommodate the needs of the strobe circuit to be chosen by one skilled in the art. Any of a variety of conventional multivibrator circuits known to the art may be employed as the element 94. A ten millisecond time constant has been found to be suitable for this purpose.

While the inventor named herein has selected the general functions to be performed by the circuits as shown in FIG. 4, the specific circuit arrangement, component choice and component values have been provided by others skilled in the art at the direction of the inventor.

Briefly summarizing the operation of the invention, therefore, the transducer is selected for its ability to develop a signal which varies in accordance with cylinder pressure and which is adaptable to the access ports normally provided for glow plugs in most light duty diesel engines. This signal is interfaced in an isolation amplifier 90 and then filtered in the filter 92 to derive a primary pulse indicative of a rise in pressure occurring at the initiation of combustion. Noise that might result from other variations on the pressure signal falling within the frequency band of the filter 92 is effectively disregarded or "cleaned" from the filter output by the variable threshold detection circuit 93. The output of the threshold detection circuit is thereafter applied to the monostable multivibrator 94 to generate the fixed width pulse shown at curve C of FIG. 2. This pulse is applied to the strobe light 36 to trigger the strobe into flashing at a rate proportional to the occurrence of firing within the number one cylinder. Consistent with normal practice in existing timing lights for spark ignited engines, the strobe light is aimed at the markings on the dynamic damper or other engine-driven components. To the eye of the user, therefore, the stroboscopic effect makes it appear that the fixed marker mounted to the engine repetitively points to the same number on the dynamic damper which is indicative of the actual timing of firing within the cylinder. It will be appreciated that the latter phenomena results from the integration performed by the human eye as a result of the stroboscopic effect.

From the foregoing it will be appreciated that there has been brought to the art a timing system for diesel engines which has all of the advantages heretofore available only in spark fired, internal combustion engines. This has been achieved through the combination of known technology and components with additional signal processing techniques to provide an integrated system heretofore unavailable in the art and in the marketplace. The system retains operational characteristics which make it attractive to mechanics already skilled in the use of timing lights for spark ignited engines. Accordingly, it is easy to use, relatively inexpensive to manufacture and capable of being constructed with a relatively small number of parts.

While the timing light can be used by itself in the manner described above, it may be combined in use with a tachometer for indicating engine speeds. To this end, the circuit of FIG. 4 includes a tachometer circuit 170 coupled to receive the output of the transducer 30. A tachometer circuit suitable for use with the piezoelectric transducer described herein is also set forth in the aforesaid U.S. Pat. No. 4,185,494 of Creative Tool Company.

I claim as my invention:

1. Apparatus for monitoring the timing of combustion within the cylinder of a diesel engine having a glow plug aperture comprising:

a transducer adaptable to said glow plug aperture for developing a signal that varies with pressure changes within said cylinder which include a primary pressure rise occurring at the point of combustion;

circuit means for receiving said transducer output signal and for developing a timing pulse in response to the variation of said signal resulting from said combustion pressure rise, while being non-responsive to all other variations of said transducer signal;

a high intensity strobe light for providing a flash of illumination upon occurrence of said timing pulse to provide a visual indication of combustion timing.

2. In combination: a diesel engine having timing marks thereon for indicating the position of at least one cylinder relative to its Top Dead Center position and an aperture for normally housing a glow plug extending into said one cylinder; and a timing light system including (a) a piezoelectric transducer adapted to replace the glow plug in its aperture in said one cylinder for developing a signal which varies in accordance with pressure changes occurring within said cylinder, including a primary pressure rise resulting from combustion;

(b) circuit means coupled to said transducer for receiving said transducer output signal and producing a timing pulse solely in response to said primary combustion pressure rise, while being substantially non-responsive to all other variations of said transducer output signal, and (c) a strobe light coupled to said circuit means for providing a flash of illumination in response to said timing pulse for selectively enabling the illumination of said timing marks to provide a stroboscopic visual representation of the relative timing between combustion and the achievement of the Top Dead Center position of the piston within said cylinder.

3. Apparatus according to claims 1 or 2 further including a tachometer circuit coupled to said transducer for providing a visual indication of engine speed simultaneously with the activation of said strobe light.

4. In combination, a vehicle timing light having a power source and a triggerable actuator circuit adapted to repetitively energize said light for short bursts of illumination upon occurrence of a predetermined input signal, a pressure transducer adapted to be coupled to the glow plug aperture in a cylinder of a diesel engine and providing a signal which varies in accordance with pressure changes within said cylinder and a discriminator circuit responsive to said transducer signal for developing said predetermined input signal to said timing light only at the initiation of combustion within said cylinder giving rise to a primary pressure rise within said cylinder.

* * * * *